(12) United States Patent
Laachachi et al.

(10) Patent No.: US 12,378,449 B2
(45) Date of Patent: Aug. 5, 2025

(54) MULTI-MATERIAL DISASSEMBLY

(71) Applicant: Luxembourg Institute of Science and Technology (LIST), Esch-sur-Alzette (LU)

(72) Inventors: Abdelghani Laachachi, Esch-sur-Alzette (LU); Nicolas Burger, Esch-sur-Alzette (LU); Gregory Mertz, Esch-sur-Alzette (LU); David Ruch, Esch-sur-Alzette (LU)

(73) Assignee: Luxembourg Institute of Science and Technology (LIST), Luxembourg (LU)

( * ) Notice: Subject to any disclaimer, the term of this patent is extended or adjusted under 35 U.S.C. 154(b) by 248 days.

(21) Appl. No.: 17/922,523

(22) PCT Filed: Apr. 28, 2021

(86) PCT No.: PCT/EP2021/061158
§ 371 (c)(1),
(2) Date: Oct. 31, 2022

(87) PCT Pub. No.: WO2021/219736
PCT Pub. Date: Nov. 4, 2021

(65) Prior Publication Data
US 2023/0340308 A1    Oct. 26, 2023

(30) Foreign Application Priority Data
Apr. 30, 2020   (LU) ......................................... 101761

(51) Int. Cl.
*B32B 41/00*    (2006.01)
*C09J 11/04*    (2006.01)
*C09J 163/00*   (2006.01)

(52) U.S. Cl.
CPC ............. *C09J 163/00* (2013.01); *C09J 11/04* (2013.01); *C09J 2301/312* (2020.08); *C09J 2301/408* (2020.08); *C09J 2301/502* (2020.08)

(58) Field of Classification Search
CPC .... C09J 163/00; C09J 11/04; C09J 2301/312; C09J 2301/408; C09J 2301/502;
(Continued)

(56) References Cited

U.S. PATENT DOCUMENTS

| 4,160,073 A | 7/1979 | Lloyd-Lucas |
| 5,091,243 A | 2/1992 | Tolbert |

(Continued)

FOREIGN PATENT DOCUMENTS

| EP | 0 192 218 A | 8/1986 |
| EP | 0 224 484 A1 | 6/1987 |
| EP | 1 560 709 A2 | 8/2005 |

OTHER PUBLICATIONS

International Search Report mailed Jun. 29, 2021 in PCT App. No. PCT/EP2021/061158.

*Primary Examiner* — Michael N Orlando
*Assistant Examiner* — Joshel Rivera
(74) *Attorney, Agent, or Firm* — Sandberg Phoenix & von Gontard PC; Scott T. Gray (57) ABSTRACT

A composite material comprising at least two substrates onto which a layer of an intumescent composition is set therebetween, the composition comprising a mixture of following individual constituents: from 5 weight % to 70 wt % of at least one carbon source, from 0 weight % to 50 wt % of at least one acid source, and from 5 weight % to 50 wt % of least one expanding agent, the total being 100 wt %, wherein the intumescent composition is active at an intumescent predetermined temperature of from 120° C. to 450° C., the intumescent temperature being less than the degradation temperature of the at least two substrates. Also a use of the
(Continued)

intumescent composition for disassembling, at an intumescent predetermined temperature of from 120° C. to 450° C., a composite material comprising at least two substrates onto which a layer of the intumescent composition is set therebetween.

20 Claims, 5 Drawing Sheets

(58) Field of Classification Search
CPC ..... C09J 2463/00; C09J 5/06; B32B 2255/06; B32B 2255/26; B32B 7/06; B32B 7/12; B32B 15/20; B32B 43/006; C08K 2003/2227; C08K 2003/323; C08K 3/04; C08K 3/22; C08K 3/32; C08K 3/34; C08K 5/34928; C08K 5/5313; C08K 5/005; Y02P 20/582; Y02W 30/62; C09D 7/48; C09D 7/61; C09D 7/63; C09D 163/00; C09D 5/185; B29B 17/04; B29B 2017/0496; B29B 17/02; B29L 2009/00; C08L 63/00
USPC ................... 156/60, 64, 350, 351, 378, 379
See application file for complete search history.

(56) References Cited

U.S. PATENT DOCUMENTS

| | | |
|---|---|---|
| 2012/0080144 A1 | 4/2012 | Tong |
| 2016/0168394 A1 | 6/2016 | Kreh |
| 2020/0032081 A1 | 1/2020 | Kann |

MULTI-MATERIAL DISASSEMBLY

CROSS-REFERENCE TO RELATED APPLICATIONS

The present invention is the US national stage under 35 U.S.C. § 371 of International Application No. PCT/EP2021/061158 which was filed on Apr. 28, 2021, and which claims the priority of application LU101761 filed on Apr. 30, 2020 the contents of which (text, drawings and claims) are incorporated here by reference in its entirety.

FIELD

The invention is directed to an efficient disassembly of multi-material products into mono-material constituents

BACKGROUND

Efficient disassembly of multi-material products into mono-material constituents is essential for life extension, maintenance, repair, materials recovery and valorization in new applications, and represents a key challenge in the life cycle of complex products.

Specific to composites, three main recycling techniques are practiced industrially: (i) recovery of materials by chemical processes, (ii) incorporation of regrind during compounding, and (iii) energy recovery through incineration. None of these approaches are sustainable as currently practiced. Incineration destroys the composite and converts high value materials to greenhouse gases. Chemical processes involve highly aggressive chemicals and/or process conditions (temperature and pressure), while mechanical grinding compromises fiber continuity. Incomplete resource recovery and properties degradation are persistent issues, and the lack of complete separation of fibers or of other matrices and the polymer matrix/support limits the development of more sustainable approaches to composite recycling. While the debonding via Diels-Alder chemistry described in the literature, the ability to bring multiple solutions to bear helps to ensure that the promise of the overall concept is realized in practice.

Bassam J. et al., ("A Process to Recover Carbon Fibers from Polymer-Matrix Composites in End-of-Life Vehicles", 2004, Journal of The Minerals., Vol. 56, Issue 8, 43-47) present general review summarizing the main processes used to recover fibers in fiber-reinforced polymers. Simple and classic processes are presented therein, such as thermal treatment (heating to degrade the matrix), chemical treatment (solvent, acids, etc. . . . ) to degrade the matrix, or thermal shock treatment (high T, low T . . . ) to break the matrix.

For decades, the development of composite-based materials has been driven almost exclusively by performance criteria such as high specific stiffness. It is only in recent years that life cycle considerations have become prominent features in the design of composite-based products, with a gradual increase of recycling efforts, and growing interest for durability analyses. The issues of loop-closing, resource efficiency, waste reduction, and life-extension are to be seen as many facets of the life-cycle engineering concept, developed as an integrated method to design, manufacture, use, and recover materials and products for optimal resources turnover (JP2018199230 (A), KR101763789 (B1), CN103588989 (A), CN101928406 (A), JP2006218793 (A), JPH0733904 (A), JP2008081549 (A), US2002101004 (A1), US2019309141 (A1)).

SUMMARY

The invention has for technical problem to provide a solution to at least one drawback of the above cited prior art. More specifically, the invention has for technical problem to efficiency disassembly some composite materials in order to recover disassembled constitutive materials thereof, with the highest integrity.

For this purpose, the invention is directed to a composite material comprising at least two substrates onto which a layer of an intumescent composition is set therebetween, the composition comprising a mixture of following individual constituents:
  (i) from 5 weight % to 70 wt % of at least one carbon source,
  (ii) from 0 weight % to 50 wt % of at least one acid source, and
  (iii) from 5 weight % to 50 wt % of least one expanding agent, the total being 100 wt %,
wherein the intumescent composition is active at an intumescent predetermined temperature of from 120° C. to 450° C., the intumescent temperature being less than the degradation temperature of the at least two substrates.

The invention relies upon the incorporation (addition) of an interfacial layer of an intumescent composition onto at least two substrates, the at least two substrates being that are needed to be smoothly separated later for recovering non damaged substrates and recycling or reusing it. Under processing and use conditions, this layer will be inert, and can even contribute to multi-material assembly (adhesion). When thermally activated, however, it will undergo significant swelling thanks to the liberation of non-toxic volatile compounds, resulting in chemical debonding and mechanical fracture of the substrates. According to the invention, a known concept is exploited in an entirely new way—for the thermally induced disassembly of a composite in order to facilitate its recycling, rather than the protection of a polymeric material against fire.

The intumescent composition is active, i.e., presenting intumescent properties, at a specific heating temperature which is depending on the compounds mixture of the composition, proportion thereof and on the nature of the substrates.

Upon heating at a temperature lower than the degradation temperature of the substrates, the composition is swelling, foaming and evolves a gas which will separate the at least two substrates without any damage, each substrate being the mono-material constituent. The composition can advantageously be suited to reduce oxygen access to the substrate and to reduce fuel transport into the flame.

The intumescent composition includes the individual constituents, and optionally further constituents, such as fibers and/or a mixture of a matrix and a hardener.

In various instances the intumescent composition can be a homogenous solution, slurry, a dispersion or a solid composition. If necessary, and depending on the chemical nature of the constituents, a minimum amount of solvent is present in the intumescent composition to favor the preparation of a liquid solution, slurry or dispersion, in various insances being viscous to allow the formation of a coating between two substrates without any overflow. Typically, any solvent can be used such as ketones, like acetone, cyclic hydrocarbons containing O, N or S, such as DMSO or THF, or aromatic solvents, like toluene and xylene.

According to an alternate embodiment, the intumescent composition can be in the form of powder and/or liquid that can be prepared by a compacting step after an optional preliminary step of milling the raw intumescent composition. If the intumescent composition is a solution, a slurry or a dispersion with a solvent, the intumescent composition can be dried to release at least a part or totally the optional solvent.

According to the invention, in the intumescent composition, the at least one acid source can be omitted, and various expanding agents and/or carbon sources also acting as acid source, such as melamine-polyphosphate (MPP), ammonium-polyphosphate (APP), PEI, polyallylamine can advantageously be used instead. This reduces at a minimum the quantity of individual constituents in the intumescent composition.

Advantageously, the at least one carbon source can be selected from the group consisting of carbohydrates, such as ethylene glycol, glycerol, neopentyl alcohol, pentaerythritol; starch or starch derivatives that can include modifications that change the chemical structure of some of the D-glucopyranosyl units in the molecule, the modifications involving oxidation, esterification, or etherification; lignin; expanded graphite (EG); polyamines, such as polyallylamine; polyhydric alcohols, such as glucose, sorbitol, erythritol, xylitol, mannitol, lactitol and maltitol; and phenolic, epoxy and acrylic resins, such as thermoplastic or thermosetting resins. Examples of epoxy resins are in various insances bisphenol-based epoxy resins, novolac epoxy resins, aliphatic epoxy resins, glycidylamine epoxy resins, for example diglycidyl ether of bisphenol A (DGEBA). The phenolic resins are in various insances novolacs or resoles. Examples of acrylic resins are polyhydroxyethylmethacrylate compounds. Thermoplastic resins can be selected from the group consisting of PET, polyacrylic, polypropylene, polycarbonate, PBT, vinyl, polyethylene, PVC, PEI and Nylon, or mixtures thereof. The thermosetting resins can be selected form the group consisting of polyester, vinyl ester, epoxy, phenolic and urethane resins, or mixtures thereof. In various exemplary instances the at least one carbon source can be selected from phenolic resins, epoxy resins, and acrylic resins, EG and mixture thereof.

Advantageously, the at least one acid source can be selected from the group consisting of phosphoric, sulfuric and boric acids, in various instances as powders, ammonium polyphosphate (APP) with high polymerization degree, with n>1000, or with a short an linear chain, with n<100; melamine polyphosphate (MPP); metal phosphinates, the metal being Zn or Al; red phosphorous; 9,10-dihydro-9-oxa-10-phosphaphenanthrene-10-oxide (DOPO) and derivatives thereof; triaryl phosphates and resorcinol bis(diphenyl phosphate) (RDP), or mixtures thereof. In various exemplary instances, the at least one acid source is one or a mixture of mentioned the phosphoric compounds generating phosphoric acid that would in turn react with the at least one carbon source. In various exemplary instances, the at least one acid source can be selected from APP, MPP, DOPO, and mixture thereof. The phosphoric compounds mentioned above are the preferred ones because of their higher efficiency in terms of the thermodynamic aspect of the activation, i.e activation temperature, or reaction with the at least one carbon source and their easy implementation.

All these compounds of acid source are the best suited for obtaining the best smooth separation of the substrates with a minimum acceptable damages. For this reasons, some compounds are in various insances excluded, such as fatty organic acids and tricarboxylic acids, especially citric acid, alkyl substituted citric acid, citric acid, $C_{15}$-$C_{20}$ fatty organic acid, such as stearic acid.

Advantageously, the at least one expanding agent (or otherwise named blowing or swelling agent) can be able to release non-flammable gases, $H_2O$, CO, $CO_2$ et $NH_3$, and can in various insances be selected from the group consisting of polyethylenimine (PEI); polyallylamine; $Al(OH)_3$; $CaCO_3$; $Mg(OH)_2$, $Na_2SiO_3$; azo compound, bearing a diazenyl functional group (R—N═N—R'), in which R and R' can be either an aryl group, such as phenyl and cresyl, and/or an alkyl group, such as azodicarbonamide (ADCA); melamine; hydrazine derivatives, such as hydrazodicarbonamide (HDCA), and nitroso compound, in various insances N,N-dinitrosopentamethylene-tetramine (DPT), such as C-nitroso compounds, for example nitrosoalkanes, S-nitroso compounds, for example nitrosothiols, N-nitroso compounds, for example nitrosamines and O-nitroso compounds, for example alkyl nitrites; APP; or mixtures thereof. In various exemplary instances the at least one expanding agent can be selected from the group consisting of $Al(OH)_3$; $Mg(OH)_2$, $Na_2SiO_3$, APP, MPP, melamine and mixture thereof.

For example, the intumescent composition can comprise from 5 wt % to 70 wt % of the at least one carbon source, from 0 wt % to 40 wt % of the at least one acid source, and from 5 wt % to 40 wt % of the at least one expanding agent, the total being 100 wt %.

The intumescent predetermined temperature can be of from 120° C. to 400° C., in various insances of from 160° C. to 400° C., for example of from 200° C. to 400° C., such as of from 280° C. to 400° C.

In some other exemplary embodiments the intumescent predetermined temperature can be in the range of from 100° C. to 140° C., for example of from 120° C. to 140° C., and in the range of 245° C. to 400° C., such as of from 280° C. to 400° C. The use of low intumescent temperatures, i.e 100° C. to 140° C. or 120° C. to 140° C. is well suited for a very smooth and without any damage disassembly, also not requiring complicated heating devices and for saving energy costs.

Higher temperature ranges 245° C. to 400° C., for example of from 280° C. to 400° C., can be applied/supplied with wider or more versatile known heating devices, such oven or heating beams (IR) or laser beams.

In some alternate embodiments, the range of intumescent temperatures of from about 145° C. to about 235° C. are excluded, especially when vinyl chloride polymers substrates are used.

According to an exemplary embodiment, the intumescent composition can be incorporated into a matrix to provide an intermediate layer between the at least two substrates. The matrix can be advantageously used as a glue material or as an adhesive bonding, to bond both substrates. Therefore, the interfacial region between two bonded substrates, providing the composite material, can have a significant influence on the behavior and performance of the composite material.

Alternately, the intumescent composition is present in the matrix in the form of pellets and/or powders.

The matrix can in various insances be based on a polymeric resin, for example being selected from the group consisting of phenolic, epoxy and acrylic resins, or mixtures thereof, and can advantageously play the role of the at least one carbon source, avoiding then the need of another carbon source different of the polymeric resin. In such a case, the intumescent composition is based on the at least one expanding agent and, optionally, on the at least one acid source, and the total content thereof can be in the range of from 30 wt % to 50 wt %, in various insances of from 30 wt % to 40 wt %, in the matrix, the total being 100 wt %, i.e the matrix wt % range is of from 70 to 50, in various insances of from 70 to 60.

Hardeners can also in various insances be added to the polymeric matrix, for example at steochiometric proportion. Common classes of hardeners used for such resins are known to one skilled in the art, and are easily commercially available. For example, di-amine hardeners can be used, like diethylenetriamine (DETA), isophorone diamine (IPDA), diaminocyclohexane (DACH); hardeners for epoxy resins can include amines, acids, acid anhydrides, phenols, alcohols and thiols. Another example of such an hardener is a 4,4'-diaminodiphenyl sulfone (DDS).

According to an exemplary embodiment, the intumescent composition can include fibers, such as carbon and glass fibers or a mixture thereof, resulting to fibers coated with the intumescent composition. The at least two substrates are not limited and can be selected from the group consisting of metal, glass, polymer, ceramics, stickers and mixtures thereof. In various instances, the metal can be aluminium, steel, iron and any other metal. The polymer can be all kinds of polymers that are used in various fields like automotive; building & construction; aeronautics and space fields.

Most specific individual constituents of the intumescent composition can be, independently, the following:
    carbon source: DGEBA;
    expanding agents: $Al(OH)_3$; $Mg(OH)_2$, $Na_2SiO_3$, APP or melamine;
    acid source: if applicable, APP, MPP or DOPO;
wherein the total content of the expanding agent and of the optional acid source is between 30 wt % and 50 wt %, in various insances of from 30 wt % to 40 wt %, the carbon source being of from 50 wt % to 70 wt %, in various insances of from 60 wt % to 70 wt %. For such intumescent composition, the intumescent temperature is in the range of 320° C. to 400° C., measured by thermogravimetric analysis (TGA). When, for example, APP or MPP is used as expanding agent, then the acid source is omitted.

Accordingly, other specific individual constituents of the intumescent composition can be, independently, the following:
    carbon source: DGEBA;
    expanding agents: APP or MPP;
    acid source: no constituent.
wherein the content of the expanding agent is between 30 wt % and 50 wt %, in various insances of from 30 wt % and 40 wt %, the carbon source being of from 50 wt % to 70 wt %, in various insances of from 60 wt % to 70 wt %. For such intumescent composition, DGEBA+APP, or DGEBA+MPP, the intumescent temperature is respectively of 350° C. and 375° C. It should be pointed out that for the mixture DGEBA+APP, the intumescence is about 350° C., less desirable, probably explained by kinetic considerations.

The layer of the intumescent composition can totally cover the substrates.

In some embodiments, the layer of the intumescent composition can cover at least partly the surface of the at least two substrates in contact thereof. This allows to save the quantity of the intumescent composition to use. As an example, for the technical effect to be attained, at least 50% of the surface of the two substrates can be covered, for example at least 60%, better at least 70%, especially at least 80% or even at least 90%. In various exemplary instances, at least 95% of the substrates are covered or even 100%.

In some embodiments, only one layer of the intumescent composition can be used. This presents the advantage to save the quantity of the raw products constituting the composition.

The invention also relates to a composite material of the invention as a structural part of devices included in car, planes, space ships, electronic and medical devices and computers.

The invention also relates to a process of disassembly of a composite material into mono-material constituents thereof, comprising the following steps of:
  a) providing a composite material comprising at least two substrates onto which a layer of an intumescent composition is set therebetween, the composition comprising a mixture of individual constituents of the invention;
  b) applying an intumescent predetermined temperature of from 120° C. to 450° C. to the composite material to disassembly it to obtain mono-material constituents, the intumescent temperature being less than the degradation temperature of the at least two substrates.

Before step a), the process can include a step of preparing the composite material (i) by mixing the individual constituents, at temperatures of from 100° C. to 150° C., better of from 110° C. to 130° C., to obtain a homogenous solution, slurry or a dispersion or a dry composition, (ii) setting a layer of the intumescent composition between the at least two substrates. If necessary, and depending on the chemical nature of the constituents, a minimum amount of solvent is added in the intumescent composition to favor the preparation of a liquid solution, slurry or dispersion, in various insances being viscous to allow a better formation of a coating between two substrates without any overflow.

Before step a), the process can comprise a step of addition of a matrix in various insances based on a polymeric resin, for example being selected from the group consisting of phenolic, epoxy and acrylic resins, or mixtures thereof, and can advantageously play the role of the at least one carbon source, avoiding then the need of another carbon source or mixtures thereof, and of a hardener into the intumescent composition.

Besides, before step a), fibers can be added to the intumescent composition optionally containing the polymeric matrix, resulting in coated fibers. When thermally activated, it will then undergo significant swelling owing to the liberation of non-toxic volatile compounds, resulting in chemical debonding, mechanical fracture of the matrix and physical liberation of the fibers. The fibers can be in the form of a non-woven material onto which the intumescent composition is dipped.

In step a), the intumescent composition can be coated or deposited on only one side of the substrate, by any known techniques, like Layer-by-layer deposition or spraying techniques to form the composite material, each the substrate being a mono-material constituent.

According to an exemplary embodiment, when, in the composite material, the intumescent composition comprises the matrix, as the at least one carbon source, the hardener, the at least one expanding agent and optionally the at least one acid source, the process can in various insances include, after step a) and before step b), a step of curing the intumescent composition in the composite material, the at least two substrates of the composite material being under pressure to allow the composite material substrates to be sticked. The curing temperature is chosen to be less that the intumescent temperature of a considered intumescent composition, other things being equal. In some embodiments, the curing temperature can in various insances be of from 160° C. to 200° C., for example, of from 170° C. to 190° C., a curing duration can be in various insances between 2 h to 4 h.

Fibers can also be incorporated into the preceeding intumescent composition, the fibers are then coated by the intumescent composition comprising the matrix or not. In some instances, fibers can first be incorporated into the intumescent composition not including the matrix, curing the fibers containing-intumescent composition system, after a stirring step, then adding the cured system, in various insances as a powder, to the matrix. If necessary, a minimum amount of solvent can be added.

The vol % of the cured system (fibers coated with cured intumescent composition) in the matrix is not limited, but generally it is in the range of 40 vol % to 60 vol %, the rest being the matrix vol % to 100 vol %.

Accordingly, the process can also include, after the preceeding curing step and before the step b), a step of embedding the coated fibers further in the matrix and performing another curing step, in various insances the same as previously mentioned, to the whole mixture. Alternately, fibers are added into the intumescent composition already including the matrix.

The intumescent composition including fibers can also be incorporated between the at least substrates to form a composite material, which will upon the application of the intumescent temperature be separated into the at least two substrates and fibers.

The intumescent predetermined temperature of step b) can be of from 140° C. to 400° C., for example of from 150° C. to 380° C., for example of from 160° C. to 380° C., or in some cases, of from 200° C. to 400° C. Such intumescent temperature ranges are the best suited for the optimization of the intumescent process in term of duration and of effective recovery of the elementary constituents of the composite material without any damage thereof or slightly acceptable damages. The intumescent temperatures are higher than the curing temperatures when this occurs.

In some other exemplary embodiments the intumescent predetermined temperature can be in the range of from 100° C. to 140° C., for example of from 120° C. to 140° C., and in the range of 245° C. to 400° C., for example of from 280° C. to 400° C. The use of low intumescent temperatures, i.e 100° C. to 140° C. or 120° C. to 140° C. is well suited for a very smooth without any damage disassembly, also not requiring complicated heating devices and for saving energy costs.

Higher temperature ranges 245° C. to 400° C., for example of from 280° C. to 400° C., can be applied/supplied with more wide or versatile known heating devices, such oven or heating beams (IR) or laser beams.

In some alternate embodiments, the range of intumescent temperatures of from about 145° C. to about 235° C. are excluded, especially when vinyl chloride polymers substrates are used.

The intumescent predetermined temperature can be supplied/applied to the composite material by any classical means, like heating in an oven or heating beams (IR) or laser beams.

In various instances, step b) can be carried out using a temperature gradient, the beginning temperature is less than the intumescent predetermined temperature, for example less for about 50° C. to 200° C., the lowest value of 50° C. is for example used when intumescent temperatures are not too high, for example of from about 120° C. to 250° C., the highest value of 200° C. being especially used for intumescent temperatures of from 200° C. to 450° C. Then, an increase of the temperature is performed stepwise at a range of 5° C./min to 15° C./min, with a plateau phase of from 10 min to 15 min each 20° C.-25° C., to attain the predetermined intumescent temperature. A temperature gradient is advantageously performed to better control the intumescent process of disassembly that can be explained by the presence of some compounds presenting physical-chemical characteristics or behaviour that can react differently when the temperature is applied.

A post-curing step can be provided after the curing step, before step b), at temperature of from 200° C. to 230° C., for a duration of from 2 h to 4 h, The post-curing temperature is chosen to be less than the intumescent temperature of a considered intumescent composition, other things being equal.

Another aspect of the invention is an use of the intumescent composition comprising the individual constituents a), b) and c) of the invention for disassembling, at an intumescent predetermined temperature of from 120° C. to 450° C., a composite material comprising at least two substrates onto which a layer of the intumescent composition is set therebetween.

Another aspect of the invention is a process to disassembly a composite material including at least two substrates using an intumescent composition comprising the individual constituents a), b) and c) of the invention, the composition being set between the at least two substrates, at a predetermined temperature of from 120° C. to 450° C.

All other exemplary embodiments, such as the nature of the intumescent composition, temperature, duration, settings, for the use, as described above, do apply.

DRAWINGS

Other features and advantages of the present invention will be illustrated from the following detailed description and drawings among them.

DETAILED DESCRIPTION

Figure 1:
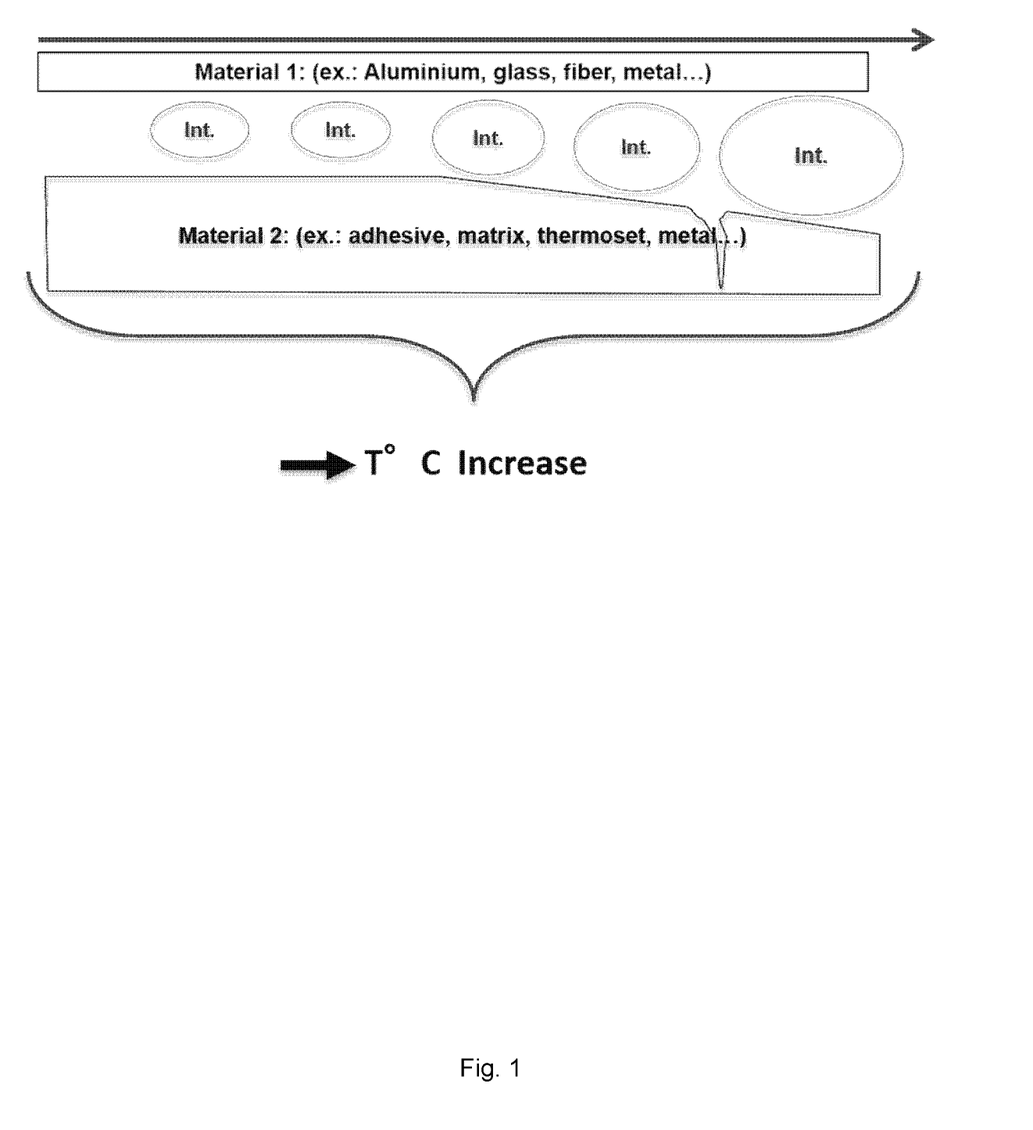
FIG. 1 is an exemplary schematic view of the principle of the invention, in accordance with various embodiments of the invention.

One approach of the invention involves the incorporation (addition) of an interfacial layer of an intumescent compound between fibers and the matrix specific to composites or between the different materials that need to be separated later (FIG. 1). Under processing and use conditions, this layer will be inert, and can even contribute to multi-material assembly (adhesion). When thermally activated, however it will undergo significant swelling thanks to the liberation of non-toxic volatile compounds, resulting in chemical debonding, mechanical fracture of the matrix and physical liberation of the fibers (FIG. 1). Here a thermally induced disassembly of a composite material is performed in order to facilitate its recycling, rather than the protection of a polymeric material against fire.

Example 1: Composite Material with Aluminium Substrates Disassembly

Figure 2:
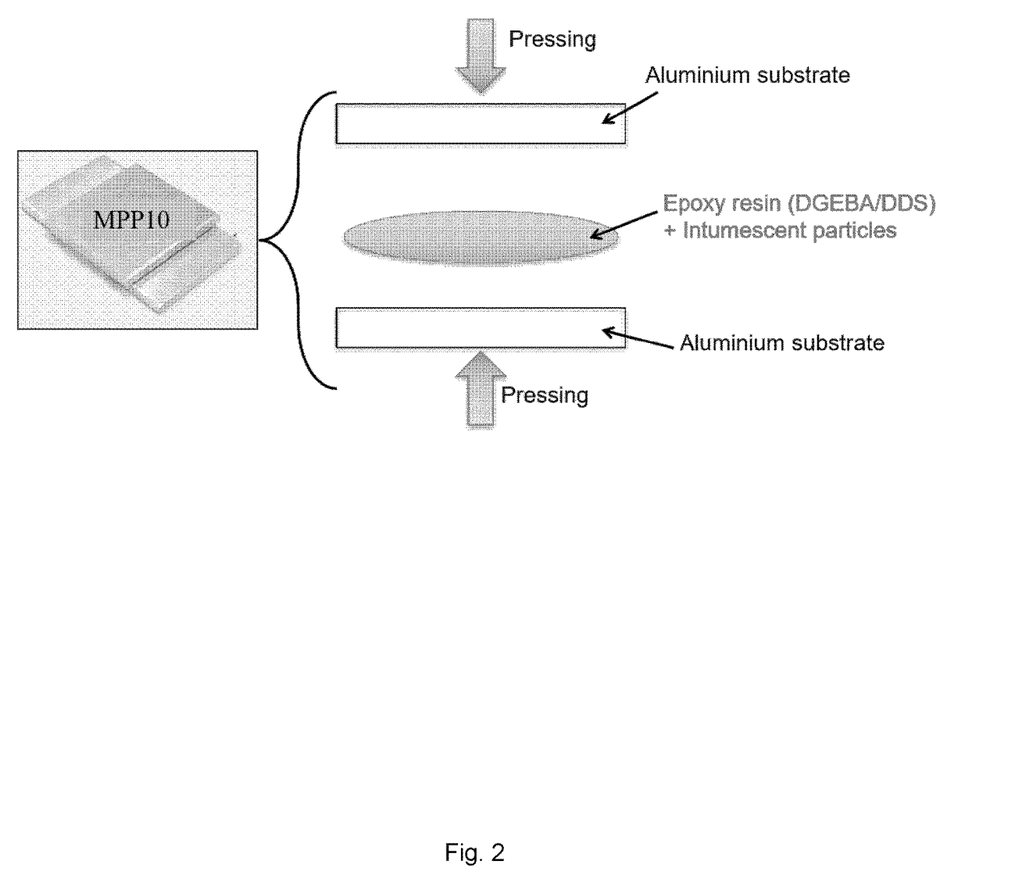
FIG. 2 exemplarily shows an example of an intumescent composition in an epoxy resin as adhesive bonding set between two aluminium substrates, in accordance with various embodiments of the invention.

The epoxy resin/metal composite materials are mainly used in paint and in glue because of their low cost and ease of use compared to other methods such as welding. It is well accepted that the properties of the interfacial region between two bonded materials have a significant influence on the behaviour and performance of the material system. For the present example, an epoxy adhesive layer is bonding aluminium substrates (FIG. 2).

Experimental Part

Materials:

Mainly:

The epoxy resin is diglycidyl ether of bisphenol A (DGEBA), from Dow chemicals (DER331). The hardener is a 4,4'-diaminodiphenyl sulfone (DDS, 97%) was purchased from Sigma Aldrich. Both were used as received. Ammonium polyphosphate (Exolit® AP 422) was given by Clariant. Melamine polyphosphate (MPP) Melapur 200®) was furnished by Ciba. DOPO (9,10-Dihydro-9-oxa-10-phosphaphenanthrene 10-oxide) was purchased from Harke Chemicals GmbH. $Al(OH)_3$, $Mg(OH)_2$ and $Na_2SiO_3$ were purchased by Sigma Aldrich. Expanded graphite (EG) was supplied by ECOPHIT G. According to the manufacturer data, the principal characteristics of the specific used GFG 5 grade of EG are: real density=2.25 $g/cm^3$, mean diameter $d_{50}$=5-7 μm, BET specific surface area=23.1 $m^2/g$. Aluminum substrates were purchased from Goodfellow.

Preparation of the Intumescent Layer (Epoxy Adhesive Layer Bonding):

Intumescent epoxy adhesive layers were prepared using several individual constituents a), b), c) incorporated into a matrix of DGEBA resin at 130° C., the matrix being the carbon source. The total loading of the individual constituents was 30 wt % and the matrix is 70 wt %. Several combinations were studied. Magnetic stirring was used to disperse the individual constituents into the DGEBA matrix to provide various intumescent compositions. DDS hardener was then added in a stoechiometric ratio to epoxy resin to the mixture, regarding the same mixing procedure. Epoxy resin and its mixtures were assembled between two substrates of aluminium in a simple recovery joint (FIG. 2). Aluminium substrates were degreased by acetone in an ultrasonic bath before use. Curing process applied to the assembly was at 180° C. for 2 h under press, followed by a 2 h post-cure at 220° C. The composition of the mixtures of DGEBA-DDS, here the carbon source, and individual constituents a), b), c) are presented in Table 1. It should be pointed out that the sample F1 incorporates EG as an additional carbon source.

TABLE 1

The compositions of the mixtures of DGEBA-DDS (matrix) and individual constituents a), b), c) (intumescent compositions)

| Sample | Matrix | Acid source | Expanding agent | Carbon source |
|---|---|---|---|---|
| F1 | DGEBA-DDS | APP | $Al(OH)_3$ | EG |

TABLE 1-continued

The compositions of the mixtures of DGEBA-DDS (matrix) and individual constituents a), b), c) (intumescent compositions)

| Sample | Matrix | Acid source | Expanding agent | Carbon source |
|---|---|---|---|---|
| F2 | DGEBA-DDS | MPP | $Mg(OH)_2$ | |
| F3 | DGEBA-DDS | DOPO | $Na_2SiO_3$ | |
| F4 | DGEBA-DDS | | APP | |
| F5 | DGEBA-DDS | | melamine | |

In F1, each individual constituent loading is 10 wt %.
In F2 and F3, each individual constituent loading is 15 wt %.
In F4 and F5, the constituent loading is 30 wt %.

Disassembly Test:

To examine the thermally responsive of the intumescent compositions into the epoxy adhesive on the disassembly of aluminium/epoxy/aluminium composite materials, heat treatment was used. It was made in an oven using hot air according to the following heating program: initial temperature of 200° C. for 15 min; increased at 10° C./min to 375° C. with a plateau of 15 min each 25° C. more. A disassembly test was therefore performed after a temperature increase of 25° C.

The disassembly control was therefore carried out at different temperatures for samples F1-F5, as explained above. Results are presented in FIG. 3.

Figure 3:
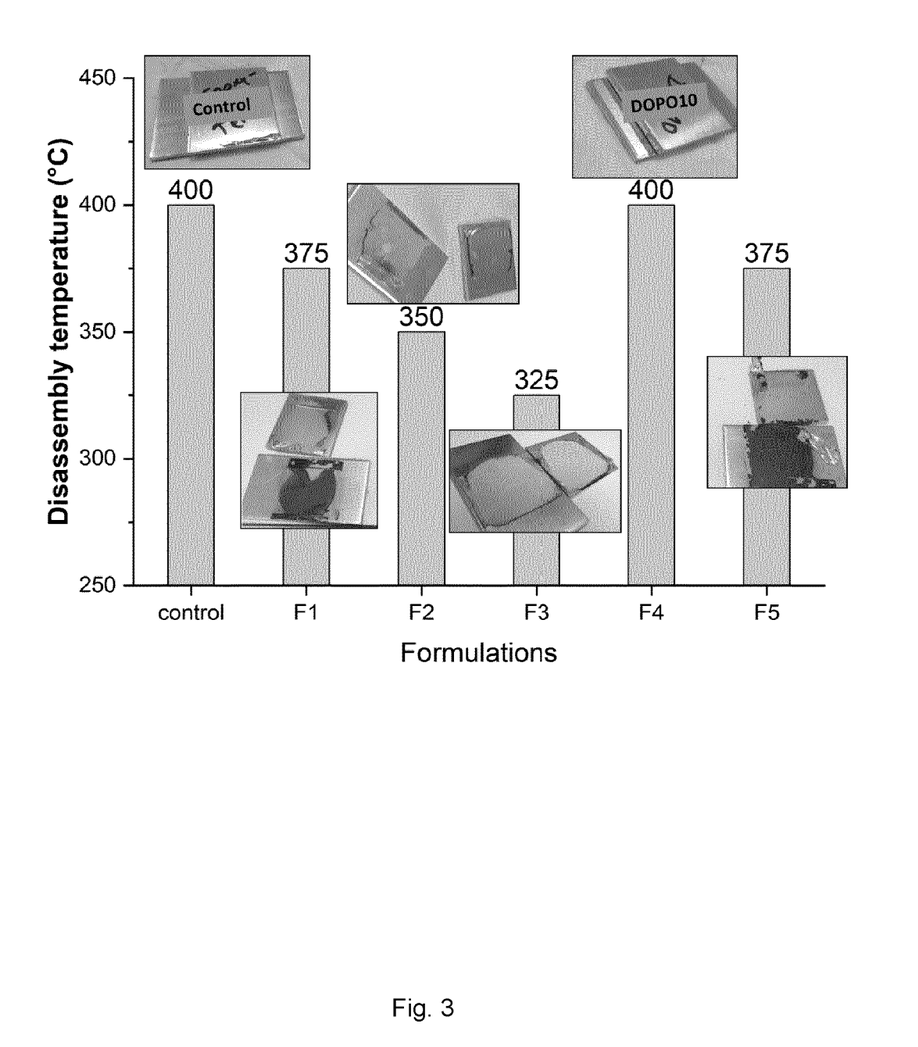
FIG. 3 exemplarily shows the results of disassembly tests for different intumescent compositions incorporated in an epoxy resin vs temperature disassembly, in accordance with various embodiments of the invention.

These results show that the reference sample, named control in the FIG. 3, (without any intumescent composition) did not break in any temperature used up to 400° C. It is important to note that this temperature limit was set, to avoid any thermal degradation of the epoxy resin (confirmed by TGA curve of cured resin epoxy). On the other hand, the disassembly of some systems at different temperatures (325° C., 350° C. and 375° C.) depending on the composition of the used formulation is obtained (Samples F1-F3, F5). It is also important to note that some formulations have not broken (at 375° C.) despite the presence of intumescent particles probably due to a kinetic problem of the launching of the swelling reaction (F4).

In order to determine the activation temperature of the intumescent composition F1-F5, thermogravimetric analysis (TGA) was used (results not shown). Several weight losses are involved for each mixture. The first degradation stage is in the range 300° C.-400° C., corresponds obviously to the beginning of the launching of the swelling reaction (disassembly).

Example 2: Fiber-Reinforced Composites Disassembly

Figure 4:
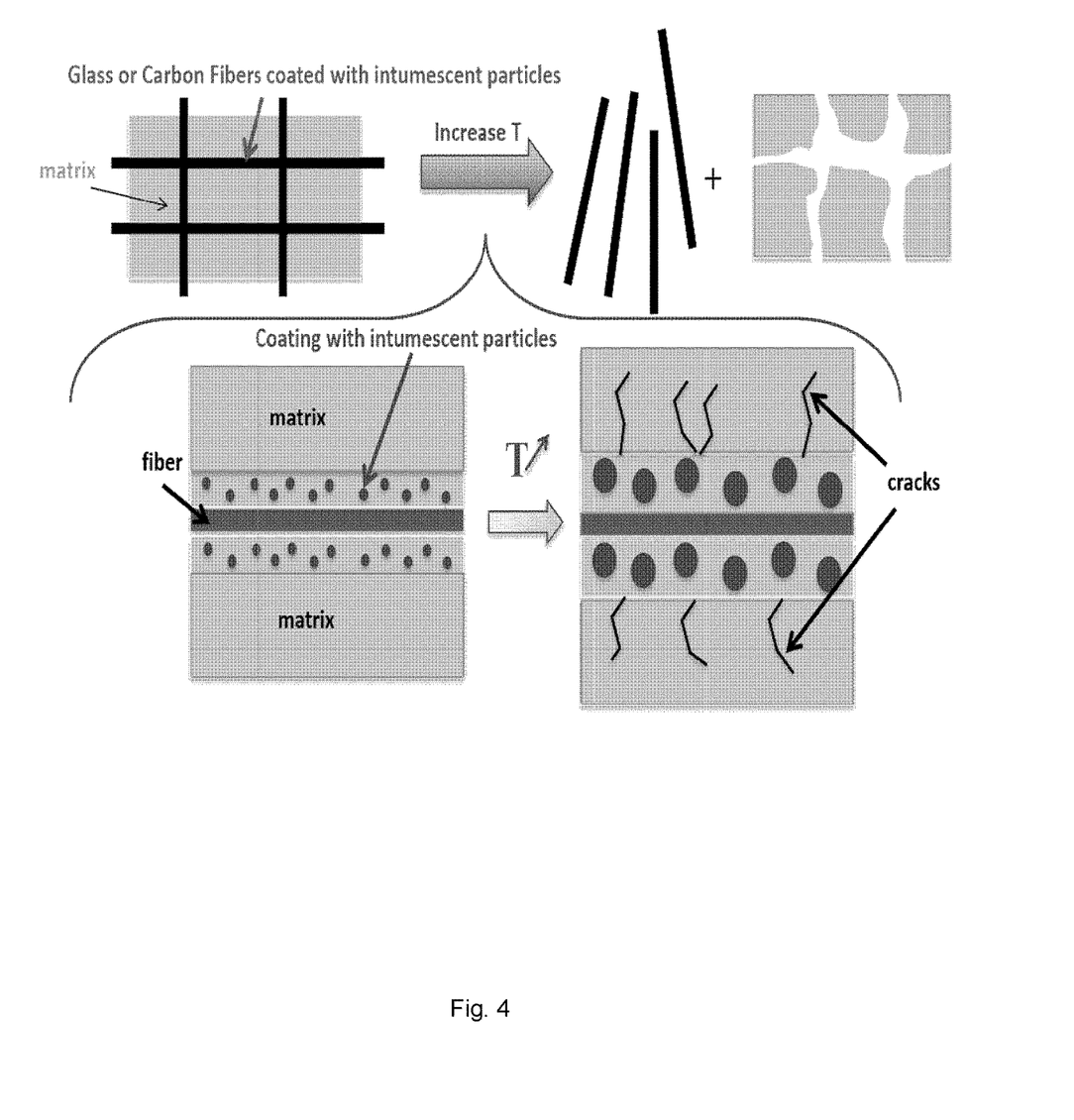
FIG. 4 is an exemplary schematic principle of disassembly of carbon or glass fibers coated with an intumescent composition set in a polymeric matrix, in accordance with various embodiments of the invention.

The invention is also applied for carbon or glass fiber recovery (FIG. 4). For that, different intumescent compositions were incorporated into interfacial layer (as coating) between the fibers and a matrix. When thermally activated, however it will undergo significant swelling thanks to the liberation of non-toxic volatile compounds, resulting in chemical debonding, mechanical fracture of the matrix and physical liberation of the fibers. It is important to note that the intumescent particles can initially be dispersed in the matrix without the coating step.

Experimental Details
Process:

Intumescent epoxy adhesive layers were prepared using several individual constituents a), b), c) incorporated into a matrix of DGEBA resin at 130° C., the matrix being the carbon source. The total loading of the individual constituents was 30 wt % and the matrix is 70 wt %. Several combinations were studied. Magnetic stirring was used to disperse the individual constituents into the DGEBA matrix to provide various intumescent compositions. DDS hardener was then added in a stoechiometric ratio to epoxy resin with the same mixing procedure. Glass fibers, 40 vol %, were coated by DGEBA and its mixtures. Curing process applied to the whole was at 180° C. for 2 h under press, followed by a 2 h post-cure at 220° C. Finally, the coated glass fibers were embedded one more time in DGEBA-DDS resin in appropriate mould and another curing cycle, the same as previously mentioned, was applied to the whole.

Disassembly Test

To examine the thermally responsive of the various intumescent compositions for fibers recovery, a heat treatment was performed with an oven using hot air according to the following heating program: initial temperature of 200° C. for 15 min; increased at 10° C./min to 375° C. with a plateau of 15 min each 25° C. A disassembly test was therefore performed after a temperature increase of 25° C. The separation of the fibers after the heat treatment was done by applying a constant force of 1 kg each time for a better comparison between the studied intumescent compositions.

Figure 5:
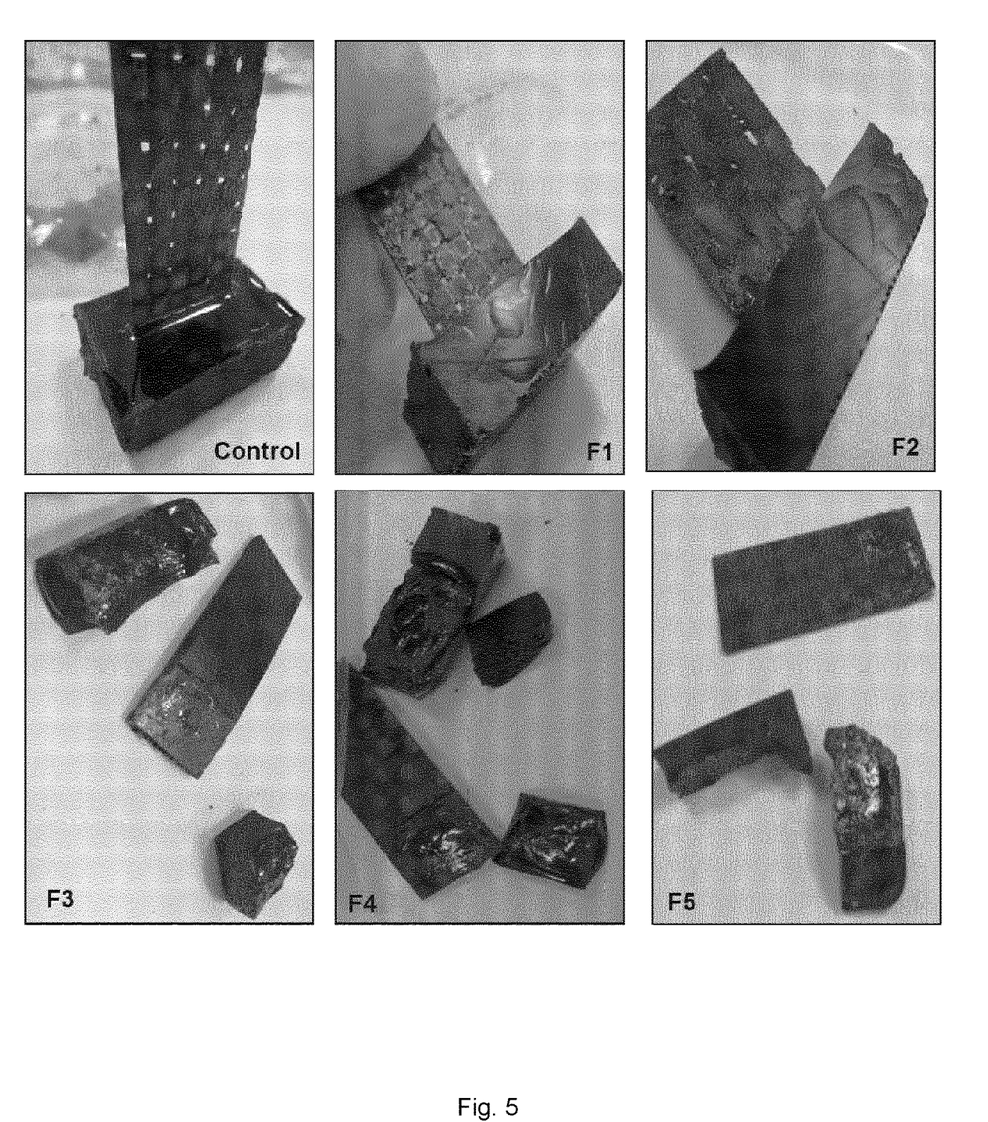
FIG. 5 exemplarily shows samples including a matrix and glass fibers after heating and disassembly tests, in accordance with various embodiments of the invention.

The disassembly control was therefore carried out at different temperatures for samples F1-F5, as explained above. Results are presented in FIG. 5.

Same conclusions as those provided for composite materials of epoxy resin/aluminium of example 1 do apply here.

Example 3: Sticker Disassembly

In this example, a PVC sticker (Hexis) was used to bond aluminum substrates. First, several coatings, made from intumescent compositions including PEI or polyallylamine as carbon source and expanding agent and MPP as acid source were applied onto a surface on an aluminum substrate using Layer-by-Layer (LBL) deposition methodology. Then the stickers were stuck on treated and untreated aluminium substrates. The same force was needed to remove the sticker on both substrates, confirming that the presence of an intumescent composition coating does not affect the adhesion between the sticker and the substrate.

After heating at 160° C. during 15 min, the stickers are easily removed from all the substrates but after cooling down, the sticker sticks again on untreated substrate but unsticks on treated substrate.

What is claimed is:

1. A composite material comprising at least two substrates onto which a layer of an intumescent composition is set therebetween, said composition comprising a mixture of following individual constituents:
   (i) from 5 weight % to 70 wt % of at least one carbon source,
   (ii) from 0 weight % to 50 wt % of at least one acid source, and
   (iii) from 5 weight % to 50 wt % of least one expanding agent, the total being 100 wt %,
   wherein the intumescent composition is active at an intumescent predetermined temperature of from 120° C. to 450° C., the intumescent temperature being less than the degradation temperature of the at least two substrates, wherein the intumescent composition covers the substrates such that applying the intumescent predetermined temperature causes the composite material to disassemble by separating the substrates.

2. The composite material according to claim 1, wherein, in the intumescent composition, the at least one acid source is omitted, and expanding agents and carbon sources, also acting as acid source, are used instead.

3. The composite material according to claim 1, wherein the intumescent composition includes further constituents, comprising at least one of fibers and a mixture of a matrix and a hardener.

4. The composite material according to claim 1, wherein the at least one carbon source is selected from the group consisting of carbohydrates; starch or starch derivatives; lignin; expanded graphite (EG); polyhydric alcohols; and phenolic, epoxy and acrylic resins.

5. The composite material according to claim 4, wherein the epoxy resins are bisphenol-based epoxy resins, novolac epoxy resins, aliphatic epoxy resins, glycidylamine epoxy resins.

6. The composite material according to claim 4, wherein the phenolic resins are novolacs or resoles, and acrylic resins are polyhydroxyethylmethacrylate compounds.

7. The composite material according to claim 1, wherein the at least one acid source is selected from the group consisting of phosphoric, sulfuric and boric acids, ammonium polyphosphate (APP), with high polymerization degree, with n>1000 or with a short an linear chain, with n<100; melamine polyphosphate (MPP); metal phosphinates, the metal being Zn or Al; red phosphorous; 9,10-dihydro-9-oxa-10-phosphaphenanthrene-10-oxide (DOPO) and derivatives thereof; triaryl phosphates and resorcinol bis(diphenyl phosphate) (RDP), or mixtures thereof.

8. The composite material according to claim 1, wherein the at least one expanding agent is able to release non-flammable gases, $H_2O$, $CO$, $CO_2$ et $NH_3$, and is selected from the group consisting of polyethylenimine (PEI); polyallylamine; $Al(OH)_3$; $CaCO_3$; $Mg(OH)_2$, $Na_2SiO_3$; azo compound, bearing a diazenyl functional group (R—N=N—R'), in which R and R' is at least one of an aryl group, and an alkyl group; melamine; hydrazine derivatives, and nitroso compound, C-nitroso compounds, S-nitroso compounds, N-nitroso compounds, and O-nitroso compounds; APP; or mixtures thereof.

9. The composite material according to claim 1, wherein the intumescent composition comprises from 5 weight % to 70 wt % of the at least one carbon source, from 0 weight % to 40 wt % of the at least one acid source, and from 5 weight % to 40 wt % of the at least one expanding agent, the total being 100 wt %.

10. The composite material according to claim 1, wherein the intumescent predetermined temperature is of from 120° C. to 400° C.

11. The composite material according to claim 1, wherein the intumescent predetermined temperature is in the range of from 120° C. to 140° C. and in the range of 245° C. to 400° C.

12. The composite material according to claim 1, wherein the intumescent composition is present in a matrix, to provide an intermediate layer between the at least two substrates.

13. The composite material according to claim 1, wherein at least 50% of the surface of the two substrates are covered.

14. A process of disassembly of a composite material into mono-material constituents thereof comprising the following steps:

a) providing a composite material comprising at least two substrates onto which a layer of an intumescent composition is set therebetween, the composition comprising a mixture of the following individual constituents,
(i) from 5 weight % to 70 wt % of at least one carbon source,
(ii) from 0 weight % to 50 wt % of at least one acid source, and
(iii) from 5 weight % to 50 wt % of least one expanding agent, the total being 100 wt %, wherein the intumescent composition is active at an intumescent predetermined temperature of from 120° C. to 450° C., the intumescent temperature being less than the degradation temperature of the at least two substrates; and
b) applying an intumescent predetermined temperature of from 120° C. to 450° C. to the composite material to disassembly it to obtain the mono-material constituents, the intumescent temperature being less than the degradation temperature of the at least two substrates.

15. The process according to claim 14, wherein before step a), the process includes a step of preparing the composite material (i) by mixing the individual constituents at temperatures of from 100° C. to 150° C., to obtain a homogenous solution, a slurry, a dispersion or a dry composition, (ii) setting a layer of the intumescent composition obtained through step (i) between the at least two substrates.

16. The process according to claim 14, wherein, before step a), fibers are added to the intumescent composition resulting in coated fibers.

17. The process according to claim 14, wherein, before step a), the process includes a step of addition of a matrix and of a hardener into the intumescent composition.

18. The process according to claim 17, wherein, when, in the composite material, the intumescent composition comprises the matrix, the hardener, the at least one expanding agent and optionally the at least one acid source, the process includes, after step a) and before step b), a step of curing the intumescent composition in the composite material, the at least two substrates of the composite material being under pressure.

19. The process according to claim 14, wherein the temperature in step b) is in the range of from 120° C. to 140° C. and in the range of 245° C. to 400° C.

20. The process according to claim 14, wherein step b) is carried out using a temperature gradient, the beginning temperature is less than the intumescent predetermined temperature, then an increase of the temperature is performed stepwise at a range of 5° C./min to 15° C./min, with a plateau phase of from 10 min to 15 min each 20° C.-25° C., to attain the predetermined intumescent temperature.

* * * * *